Jan. 30, 1962

J. J. EACHUS 3,019,422

DATA PROCESSING APPARATUS

Filed Feb. 2, 1959

4 Sheets-Sheet 1

INVENTOR:
Joseph J. Eachus,

BY Bair, Freeman & Molinare
ATTORNEYS.

$\propto = [(K \leqslant R) \cdot a] \vee [(K \geqslant R) \cdot d]$ WHERE K = SEARCH KEY SOUGHT $\beta = [(K > R) \cdot a] \vee [(K < R) \cdot d]$ R = BLOCK KEY READ FROM MAGNETIC TAPE
a = ASCENDING FILE
d = DESCENDING FILE INVENTOR:
Joseph J. Eachus,
BY Bair, Freeman & Molinare
ATTORNEYS.

Jan. 30, 1962 | J. J. EACHUS | 3,019,422

DATA PROCESSING APPARATUS

Filed Feb. 2, 1959 | 4 Sheets-Sheet 3

INVENTOR:
Joseph J. Eachus,
BY Bair, Freeman & Molinare
ATTORNEYS.

INVENTOR:
Joseph J. Eachus,
BY Bair, Freeman & Molinare
ATTORNEYS.

3,019,422

DATA PROCESSING APPARATUS

Joseph J. Eachus, Cambridge, Mass., assignor to Minneapolis-Honeywell Regulator Company, Minneapolis, Minn., a corporation of Delaware Filed Feb. 2, 1959, Ser. No. 790,653
4 Claims. (Cl. 340—174.1)

This invention relates generally to improved data processing apparatus, and more particularly to improved data processing apparatus and an improved method for searching through large quantities of bulk stored data, and locating the desired data at high speed and with a minimal number of search steps.

In data processing apparatus, and particularly in large capacity apparatus of this type, it is convenient to store digital data in binary form on magnetic tape or other recording mediums. Such information is usually stored in "blocks" or in "words" made up of the presence or absence of a pulse in successive spaces, each such pulse being known as a binary digit or bit. In order to find and sense a particular word when it is required for a data processing operation, some means must be provided for identifying the desired block or word and locating it on the tape so that it may be transduced by a magnetic reading head for use in any suitable utilization device such as an electronic computer or other component of a data processing system. One prior art technique for locating a desired block in a magnetic tape is to count blocks from the beginning of the tape until the desired block is reached. Manifestly, this prior art technique is not entirely satisfactory, for it may mean that an entire spool of tape may have to be sensed before a desired block is reached.

It is a general object of this invention to provide a new and improved method and means for searching through the data recorded on a magnetic tape and for finding a desired data block or word in a minimized period of time.

In accordance with the invention the search or hunt for a desired block or word may be effected by appropriately dividing the information stored on the tape into a series of data blocks where each data block carries a key word peculiarly identifying each individual data block. Advantageously, the key word in each data block is stored in a selected portion of the block which may be selectively examined independently of the other information in the block.

Further, in accordance with one preferred embodiment of the invention, the tape is divided into two logical halves in which each half comprises a plurality of such data blocks alternately interlaced with the data blocks of the other half. The interlaced block system of recording data is shown in a preferred form in the co-pending application of Henry W. Shrimpf, entitled Storage Apparatus, bearing Serial No. 583,118, and filed May 7, 1956. This Shrimpf application shows a recording on magnetic tape to comprise a series of blocks of information, every other one of which is read when the tape is being moved in a first direction. When the tape is moved in the opposite direction, after having reached its physical end (which may be the logical middle of the tape), the alternate blocks then are read. The blocks are suitably specified by signals recorded on the tape called key words, and the blocks may be arranged on the tape in either an ascending or descending manner. An ascending tape is one which has one or more blocks successively presenting arguments of ascending value to the magnetic transducing means. A descending tape is one which has one or more blocks bearing arguments which have a descending value relationship on each block and on one subsequent block after another.

It is a further object of this invention, to provide an improved data processing method and means for effecting a data hunt on a block interlaced tape which may be recorded in an ascending or descending manner.

It is a further object of this invention, to provide such an improved method and means for effecting a data hunt on a magnetic tape which requires a minimized number of comparisons between the search key given to the apparatus and the information recorded on the tape to locate the desired data on the tape, and wherein the extent and direction of movement of the record tape is determined automatically as a result of each one of the successive comparisons.

In accordance with the invention, the search key is entered into a storage register of the data processing device, which in one preferred embodiment takes the form of a file reference unit. A data search instruction is given to the apparatus and it proceeds to hunt through both logical halves of the tape in accordance with a predetermined hunt pattern designed to minimize the search time. As set forth in greater detail below, the apparatus first reads a block key word on the second logical half of the tape with the tape moving logically backward. Those skilled in the art will readily appreciate that with an ascending file the second logical half of the tape will contain the high numbers, and with a descending file the second logical half of the tape will contain the low numbers.

After the first comparison is made between the search key and the block key word sensed on the second logical half of the tape, a decision is made by the apparatus to determine the further movement of the tape. Thus, if the block key word sought appears to be further toward the logical end of the tape (as shown by a larger search key with an ascending file, and by a smaller search key with a descending file) the second logical half of the tape then will be searched logically forward.

If the search key is not toward the logical end of the second half of the tape, the apparatus, after the first step of reading backwards one block on the second logical half of the tape, switches to the first logical half of the tape and searches forward. Successive comparisons are made between the search key in storage and the key word in each block on the first logical half of the tape during this forward search. If the search is not successfully completed on the first half of the tape, as described above, in a predetermined period of time, the second logical half of the tape will again be checked by reading one block in the backwards direction. Again, a decision is made to search forward on either the first or the second logical half of the tape. This process is continued until the sought after block is located by a match between the search key and the block key word. Thus, it can be seen that the first block read and approximately every *n*th succeeding block depending upon the extent of the predetermined time period is read backward from the second logical half of the tape. Each time during this backward reading, a decision is made to determine whether the further searching in the forward direction, will be done on the first or second logical half of the tape.

It is a still further object of this invention to provide a new and improved method and means for effecting a data hunt in a magnetic tape in accordance with a unique hunt pattern adapted to minimize the number of search steps required to locate a desired data block or word on the magnetic tape.

With these and other objects in view, my invention consists in the construction, arrangement and combination of the various parts of my data processing apparatus, and in the method of effecting a block hunt through an interlaced block tape to quickly locate a designated one of the data blocks therein, whereby the objects contemplated are attained, as hereinafter more fully set forth, pointed out in my claims and illustrated in detail on the accompanying drawings, wherein:

Figure 1:
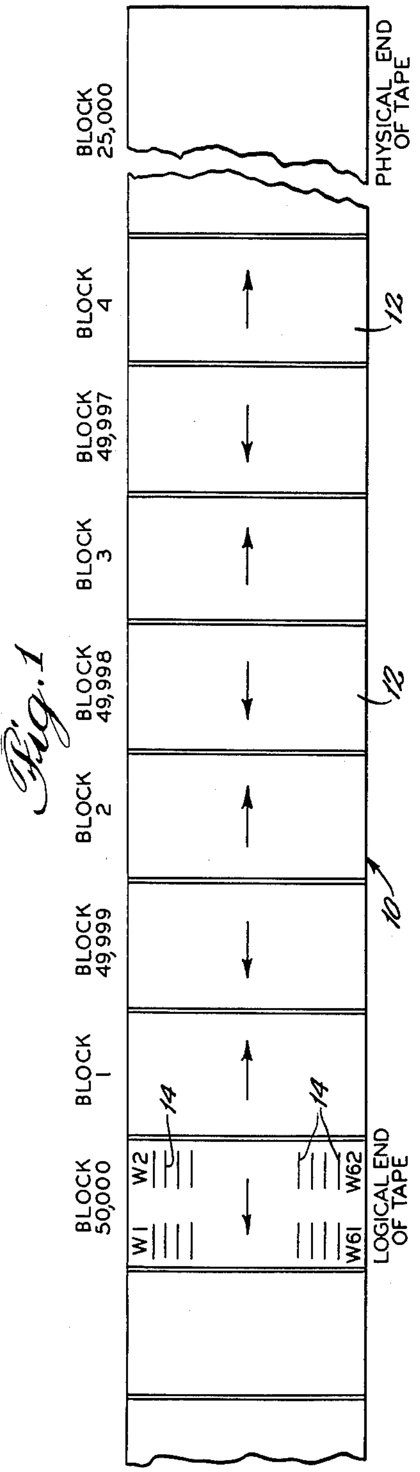
FIGURE 1 is an illustrative showing of one arrangement of interlaced data blocks on a magnetic tape used in the apparatus of the invention.

Referring now to the drawings, and more particularly to FIGURE 1 thereof, FIGURE 1 shows how the information data is stored on the record tape 10. The information data is stored in the individual blocks 12 and preferably is stored along the several information tracks 14, which may be recorded on the tape by a suitable multi-channel information transfer head. This information advantageously is stored in words each comprising the binary bits "one" or "zero" combined in any desired manner. As shown in the tape block marked "Block 50,000," the upper track 14 contains words W1 and W2, and in accordance with the specific embodiment of magnetic tape shown in FIGURE 1, the words in the information tracks 14 total 62 so that there are 31 separate tracks on the tape going from the top to the bottom of the tape. While any one of these 62 words may comprise the key word of the block to be compared with the search key, conveniently word 1 or word 2 may be designed as the block key word.

On the representative section of record tape shown in FIGURE 1 the tape is divided into information data blocks, each numbered in the order in which the blocks are read by the magnetic head. In accordance with the interlaced block system of recording, the reading takes place on every other block. Thus, every other block from the beginning is numbered 1, 2, 3, 4, etc. until the physical end of the tape has been reached, at block 25,000 for example. As soon as the physical end of the tape has been reached, the tape driving apparatus will be reversed and the tape will be driven in the opposite direction. When driven in the opposite direction, the alternate blocks are read, for example, blocks 25,001, 25,002, etc. to 50,000.

As used in the illustrative example of the present specification, the actual physical end of the tape at block 25,000 will be the logical middle of the tape. As the tape 10 is driven from its logical beginning at block 1 towards its physical end (or logical middle), it is considered as being driven on the first logical half of the tape. As the tape is driven from the physical end back toward the beginning, it is considered as being driven on the second logical half of the tape. As described in greater detail in the co-pending application of Henry W. Shrimpf, Serial No. 583,118, filed May 7, 1956, the alternate interlaced arrangement of the informational data blocks assures maximum utilization of the tape surface in the storage of information and reduces the critical requirements in the starting and stopping of the tape that exists in prior art devices.

Figure 2:
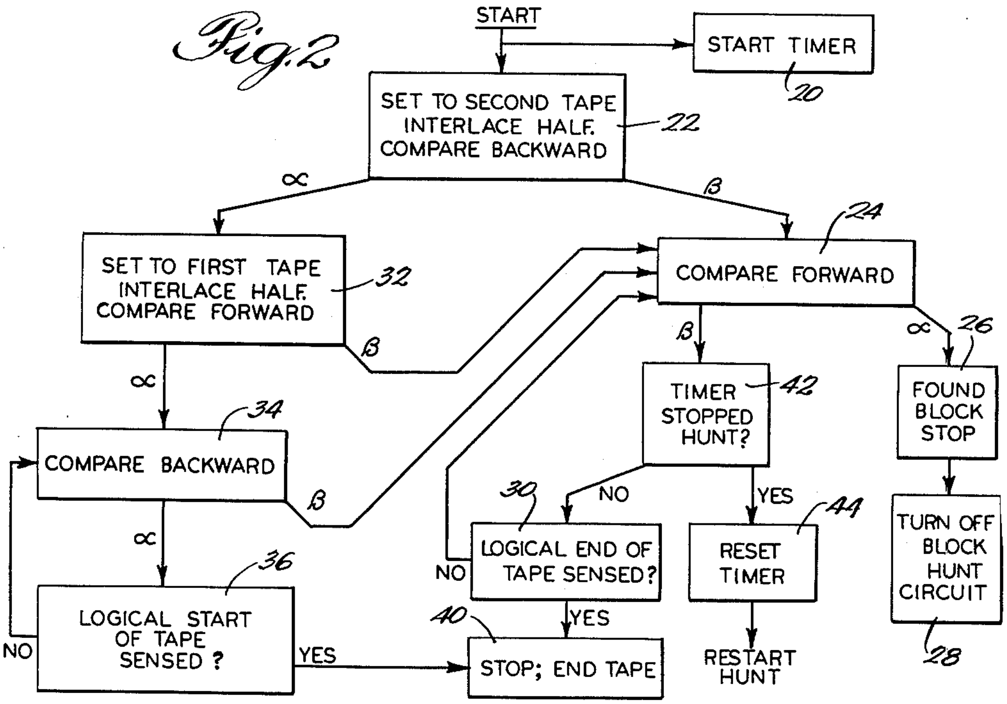
FIGURE 2 is a block diagram showing the steps of the block hunt pattern in accordance with the invention.

The unique block hunt pattern effected by the present invention in rapidly locating a desired data block on a magnetic tape carrying thousands of data blocks is shown in the flow chart of FIGURE 2. At the start of the block hunt, the timer is started at step 20, and the transducing head is set to the second logical half of the tape and reads backwards as shown in step 22. The comparison made between the search key and the key word of the last block read causes a decision to be made as determined by the difference between the search key and the key word of the block on the magnetic tape.

For the purposes of illustration, we will assume that the file is an ascending one and the search key is smaller than or equal to the key word on tape block read indicated as $\beta$ in FIGURE 2. In this case the decision of the apparatus causes the tape to move forward to compare the next forward tape block with the search key, as indicated in step 24 of FIGURE 2. If, upon successive comparisons in the forward direction on the second logical half of the tape, the search key is found, then the tape hunt is stopped as shown in step 26, and the block hunt circuit is turned off, as shown in step 28.

If, however, forward search on the second logical half of the tape continues for a length of time greater than the predetermined period of the timer, as indicated by the YES arrow for step 42 then the timer is reset in step 44, and the hunt is started all over again. This indicates that during the predetermined period of the timer, the designated block or search key has not been found, and accordingly, the search will be reinitiated. If, however, the forward search on the second logical half of the tape (step 24) continues and a match is found before the end of the predetermined time period and before the logical end of the tape is sensed, as indicated by the NO arrow from step 42, and the NO arrow from step 30, the signal will go through steps 24, 26 and 28 to indicate that the designated block has been located and to stop the block hunt. If, during this forward search, the logical end of the tape is sensed, as indicated by the YES arrow from step 30, the signal is sent to initiate step 40 to stop the tape search.

On the other hand, if, after the first reading, as shown in step 22, the comparison indicates that the tape block key word read is greater than or equal to the search key, indicated as $\alpha$, the transducing head is switched to the first logical half of the tape and the tape is read forward, as shown by step 32. Again, a comparison is made between the key word on each tape block read in the forward direction and the search key. If a comparison indicates that the search key is greater than the tape block key word in an ascending file, as shown by $\beta$ from step 32, then the tape is again compared in a forward direction as described heretofore with respect to step 24.

On the other hand, if the forward comparison in step 32 reveals that the search key is smaller than or equal to the tape block key word as shown by $\alpha$ from step 32, then the tape block key words are compared backward in a successive manner with the search key, as shown by step 34, provided that the tape does not reach its logical beginning, as sensed in step 36. If, during this successive backward search, a tape block key word is sensed which is smaller than the search key in an ascending file (or greater than the search key in a descending file) then the tape is compared forward at step 24, in the manner described heretofore. It can further be seen that if, during the successive backward comparisons of step 34, the logical beginning of the tape is sensed as shown by the YES arrow, the search is stopped at the tape end as indicated by step 40.

The mathematical basis of the block hunt pattern shown in FIGURE 3 can be set forth in the following equations:

$$\alpha\ (\text{alpha}) = [(K \leqslant R).a] v [(K \geqslant R).d]$$

$$\beta\ (\text{beta}) = [(K > R).a] v [(K < R).d]$$

where:

$K$=Search key sought
$R$=Data block key word read from the magnetic tape
$a$=Ascending file
$d$=Descending file Thus, it can now be appreciated that the specific block hunt pattern of FIGURE 2 effectively minimizes the search time on a file which covers both logical halves of the magnetic tape. The magnetic transducing head first reads a block on the second logical half of the tape with the tape moving logically backward. If the block being sought appears to be further toward the logical end of the tape (the block is larger with an ascending file and smaller with a descending file), the second logical half of the tape will be searched logically forward. If the block being sought is not toward the logical end of the second half of the tape, the magnetic transducing head, after reading backward one block on the second logical half of the tape, is switched to the first logical half of the tape and searches forward. Each block key word is compared with the search key in the storage register. Due to the action of the timer, if the search is not successfully completed on the first logical half of the tape, as described above, within a predetermined time period, the second logical half of the tape will again be checked by reading one block in the backward direction. Again, a decision is made to search forward on either the first or second logical half of the tape. This process is continued until the block sought is located on the tape.

In one illustrative example of the invention, the predetermined time period of the timer was sufficient to cover approximately 500 data blocks and accordingly, the first block and approximately every 500th succeeding block was read backward from the second half of the tape. Each time, a decision was made to determine whether further searching in the forward direction was to be done on the first or the second logical half of the tape.

Manifestly, it is contemplated that when the block search has been completed and the desired block has been located on the tape, the search can be continued within the desired block for any specific item desired, unless there is only one item per block. This item search within the designated block may be carried out in the same manner and by the same mechanism of the block hunt merely by stepping the head from reading one item to another in a successive fashion until a designated item is found. At this time the items may be read out by the transducing head and transmitted to any suitable utilization device.

Figure 3:
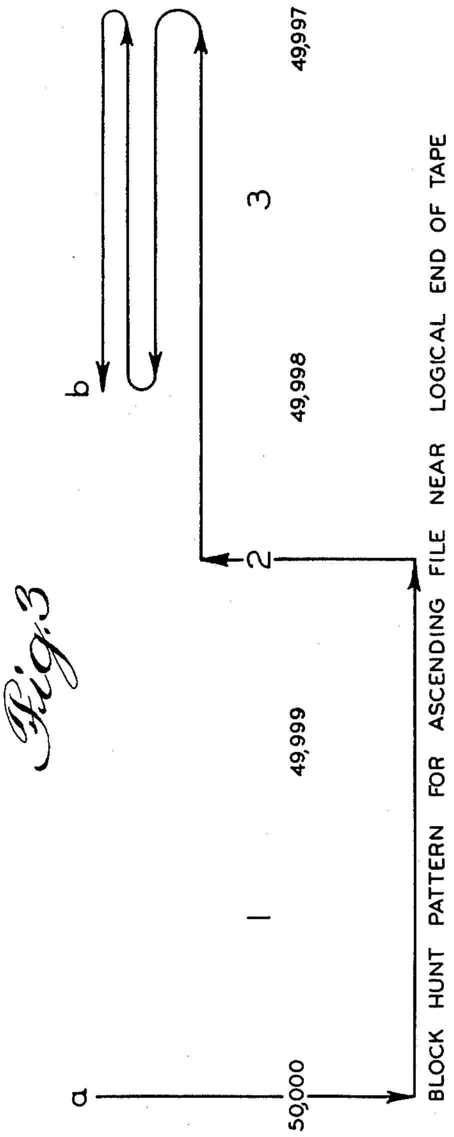
FIGURE 3 illustrates the motion of the reading head on the tape in accordance with one illustrative example of block hunt.

FIGURE 3 illustrates the block hunt pattern for an ascending file near the logical end of the tape in accordance with a specific illustrative example of the invention. As explained heretofore, the block hunt or search for a desired block is minimized by the provision of a specific hunt pattern in which a plurality of successive comparisons are made between the search key for the block sought to be located and the key words of the blocks read on the magnetic tape, which successive comparisons control the direction of tape reading and travel to locate the desired block in the shortest possible time.

For example, as shown in FIGURE 3, assume that the magnetic transducing head is sitting adjacent block 50,000 on the magnetic tape and that block number 3 is the block to be located as designated by the search key in the apparatus storage register. In the prior art devices, wherein the blocks are individually counted until the designated block is reached, this would mean a count of some 49,997 blocks before the designated block is reached. Manifestly, this prior art arrangement is completely unsatisfactory in high speed devices of the type required today.

In sharp contrast to this prior art technique, the instant invention locates the desired block in a relatively short period of time. In accordance with the invention, the tape is moved logically backwards so that the transducing head reads block 49,999. It will be noted that this is still on the second logical half of the tape in accordance with step 22 of the FIGURE 2 flow chart. The key word of the 49,999 block is read from the tape and is compared with the search key in the storage register. This comparison reveals that the desired block is not further toward the logical end of the tape, at block 50,000, but rather is away from the logical end of the tape. Accordingly, the transducing head after reading backward one block on the second half of the tape is switched to the first logical half of the tape and searches forward, as shown in step 32 of FIGURE 2. On the interlaced block tape shown in FIGURE 1, this means that the transducing head is moved over one block on the tape and then reads forward to the next block on the tape. In the illustrative example of FIGURE 3, the transducing head will switch to block number 2 and would read forward to block number 3. A comparison reveals that the block just read (block 3) is equal to the search key thereby causing the transducing head to read logically backward (step 34 of FIGURE 2) and then logically forward (steps 24, 26 and 28 of FIGURE 2) to end the search.

Figure 4:
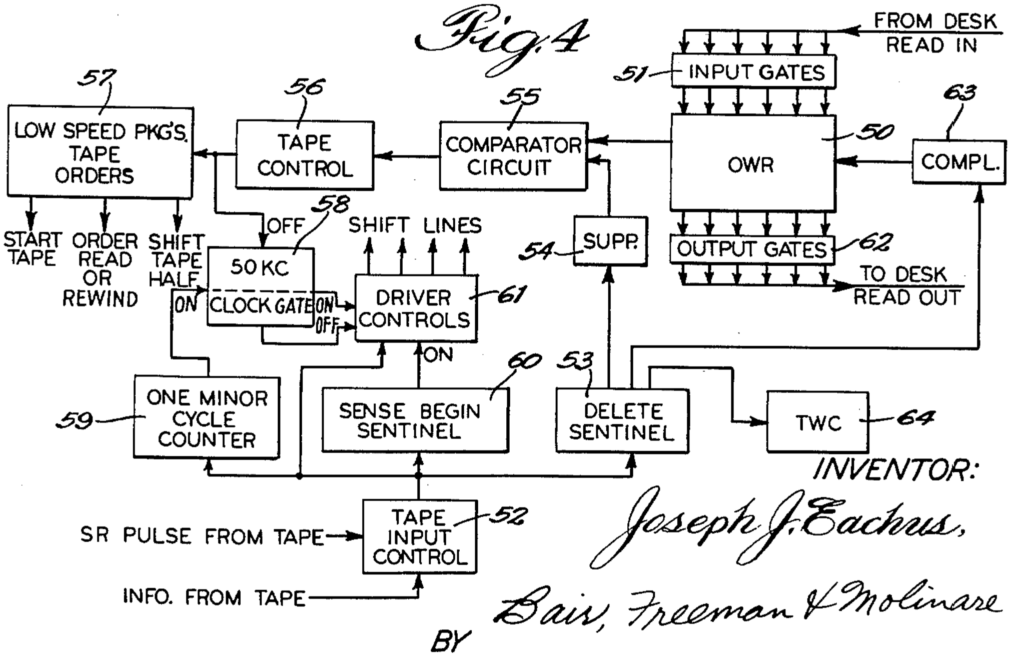
FIGURE 4 is a block diagram of the data processing apparatus in accordance with the invention, adapted to effect the block hunt pattern of FIGURE 2.

FIGURE 4 is a block diagram of an illustrative data processing circuit adapted to carry out the hunt pattern of FIGURE 2. The circuit of FIGURE 4 comprises a one word register 50 which has an input gate 51 through which the search key is read into the one word register from a suitable source, as for example a control desk. Advantageously, the one word register 50 may be of the recirculating, closed loop type such that the search key read therein is continuously circulated around the register loop.

The block information from the magnetic tape is applied to the circuit from the tape through an input gate 52 and travels through a delete sentinel circuit 53 and a suppressor circuit 54, wherein certain undesired data is removed, to a comparator circuit 55. The search key data in the one word register 50 also is applied to the comparator circuit 55 and the comparison between the search key and the block key words read from the magnetic tape is made in the comparator circuit 55 to determine the further tape reading action. The comparison between these groups of information data results in a decision, as shown in the flow chart of FIGURE 2, and the output of the comparator circuit flows through a tape control circuit 56 and a tape order circuit 57 to direct the tape motion accordingly.

The output of the tape control circuit 56 also goes through the timer circuit comprising the 50 kc. clock gate 58 and the one minor cycle counter 59, which together with the information from the sense begin sentinel circuit 60 controls the driver control circuit 61, the output of which is applied to the shift line of the one word register to shift the information bits therein around the loop. Thus, it will be appreciated that the control of tape movement, including the extent and direction of movement by the tape control circuit 56, is in accordance with the output decisions made by the comparator circuit 55 in comparing the search key with the various tape block key words read from the magnetic tape. After the desired block has been located on the tape, the block information may be read from the tape onto the one word register and then read out of the one word register through the gates 62, for transmittal to the control desk.

In addition, it sometimes is necessary to complement the information in the one word register so that it may be compared with complemented information on the magnetic tape. In this event, a signal is sent to the complement circuit 63 to properly complement the information in the one word register 50. Further, a transfer weight count circuit 64 is provided to check the accuracy of the transfer of information to the circuit from the magnetic tape.

The tape handling mechanism and tape motion control apparatus may take any one of several desirable forms, and advantageously, it may take the representative form shown in the co-pending application of Harold W. Beveridge, Serial No. 501,605, filed April 15, 1955. Further, a transfer weight count circuit, a timer circuit, and a one minor cycle counter circuit suitable for use in the instant invention, are shown in the co-pending application of Henry W. Schrimpf, entitled "Electrical Apparatus," Serial No. 636,256, filed January 25, 1957. As the details of these circuits do not form a specific part of the present invention, they will not be shown in unnecessary detail herein, but rather are illustrated in general form sufficient to enable those skilled in the art to readily practice the invention.

Figure 5:
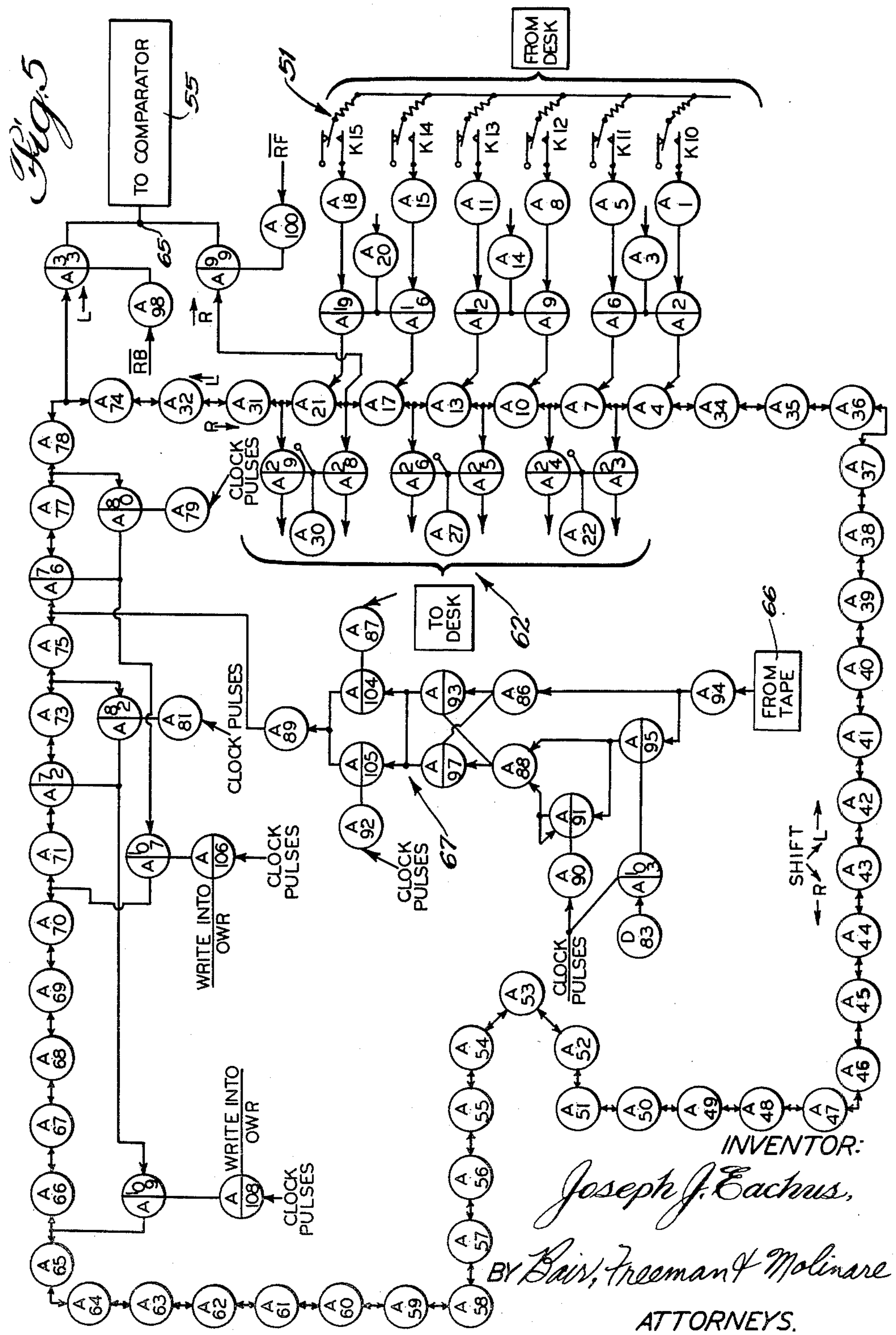
FIGURE 5 is a schematic diagram of the circuitry comprising the one word register shown in the block diagram of FIGURE 4.
Figure 6:
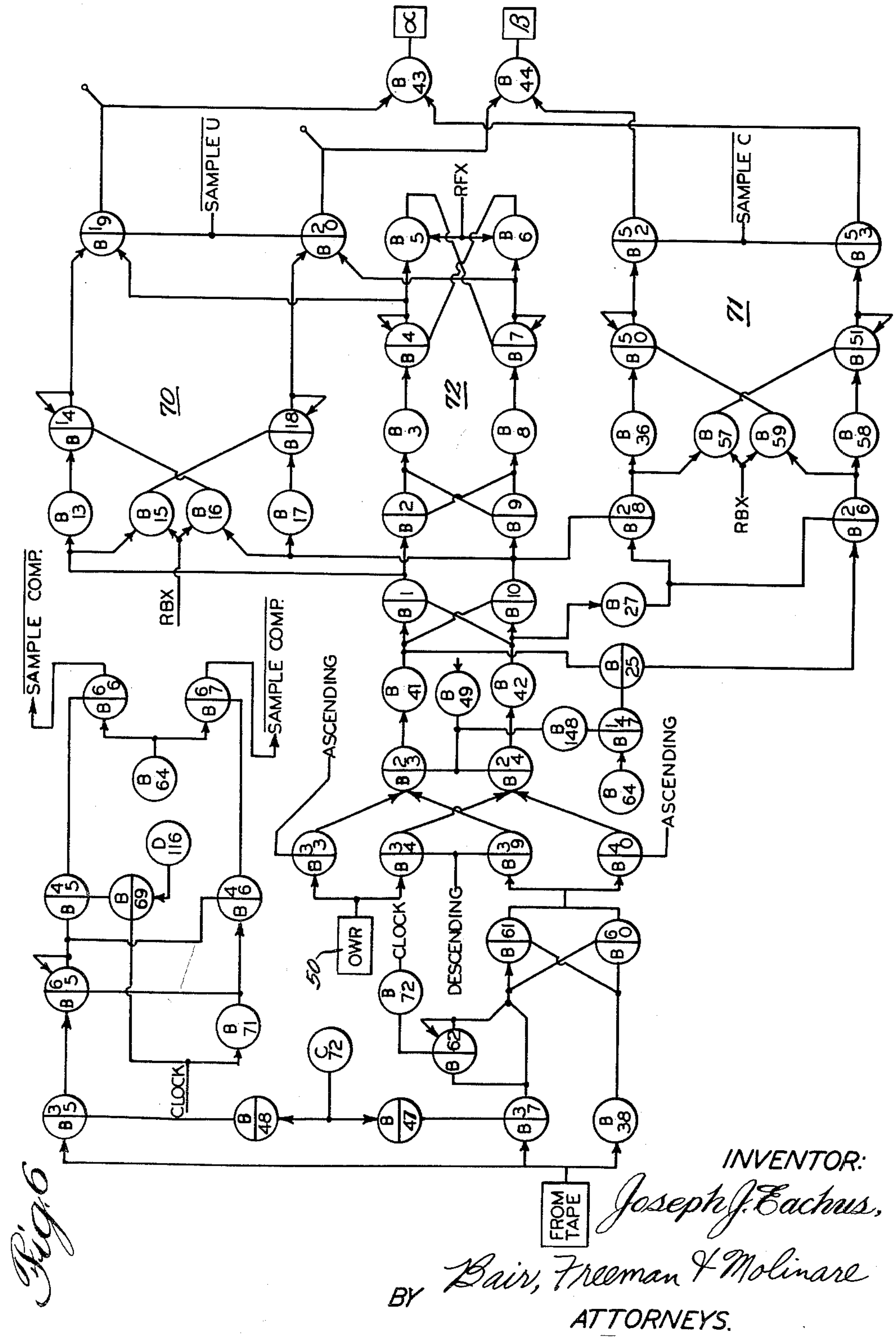
FIGURE 6 is a circuit diagram of the comparator circuit shown in the block diagram of FIGURE 4.

The details of the one word register 50 and the comparator circuit 55 are shown in FIGURES 5 and 6 of the drawing, respectively. As shown in FIGURE 5, the one word register 50 has a plurality of input circuits adapted to receive the search key data from a suitable source such as the control desk, said input circuits being identified generally at 51 and comprising the relay switch contacts K10 through K15, and the buffer and gating magnetic cores A1 through A20.

As stated, heretofore, the one word register 50 comprises a closed loop of serially connected storage components, which advantageously may take the form of magnetic cores or any other suitable storage devices. When the search key data is read into the one word register through the input gate cores A4, A7, A10, A13, A17 and A21, this information is shifted around the closed loop in response to shift pulses from the shift lines at the output of the driver control circuit 61. The manner in which the information data is shifted around the closed loop is well known to those skilled in the art, for many type of magnetic core shift registers are found in data processing apparatus now in use. It also will be appreciated that the search key data may be shifted around the loop in either direction, that is shifted clockwise or shifted counter-clockwise around the loop in accordance with the instruction signals over the shift lines of the driver control circuit 61.

As shown in the circuit diagram of FIGURE 5, the closed loop one word register 50 is provided with tapped connections between cores A17 and A21 and between cores A74 and A78. The first named tap includes a connecting signal line to core A99 and the second named tap includes a signal line to core A33. The outputs of cores A33 and A99 are connected to an output line 65 which has its output connected to the input of comparator circuit 55. The cores A33 and A99 may be inhibited by the selectively applied outputs of cores A98 and A100, respectively, to prevent the search key data from being applied to the comparator 55 except at the proper times in the register cycle of operation. Thus, cores A33 and A99 may individually be unblocked to allow the search key data to be forwarded to the comparator 55 at the proper times to effect a comparison with the block information read off of the magnetic tape during the block hunt.

After the block hunt has been completed and the desired block has been located on the tape, the search key data in the one word register may be eliminated therefrom and the information data on the selected block of the magnetic tape may be read into the one word register for transmittal therefrom to any suitable utilization device. Thus, core A94 is connected to the magnetic tape output 66 and by means of the magnetic core gating circuit 67 shown in FIGURE 5 the tape output may be read into the one word register closed loop. The gating circuit 67 controls the read in of the block data on the tape to the core A89 connected at the junction of the register cores A75 and A76 so that the information read from the magnetic tape may be circulated around the one word register 50 and read out therefrom by means of the output gate circuit 62. As shown in FIGURE 5, the output gate circuit 62 comprises the magnetic cores A22 to A30 and serves to control the transfer of the data from the register to a suitable utilization device, such as a control desk.

Referring now more specifically to the comparator circuit shown in FIGURE 6 of the drawing, the comparator serves to compare the search key data circulated in the one word register 50 with the block information data obtained from the magnetic tape 10 to the end that the successive comparisons between the search key data and the key word data read from the tape results in a coincidence to indicate that the desired data block has been located on the tape. As stated heretofore, the information data on the tape may be recorded in either an ascending or descending manner. This information, of course, must be known before the tape hunt is started, and the apparatus is set up to process either an ascending file or a descending file. The search key data from the one word register 50 is applied in parallel to the magnetic cores B33 and B34 as shown in FIGURE 6. If the apparatus has been set to process an ascending file, then core B33 will be inhibited and core B34 will not be inhibited to permit the search key data from the one word register 50 to pass through core B34 to core B24. Similarly, if the control apparatus has been set to process a descending file, core B34 will be inhibited and core B33 permits the search key data to pass therethrough to the core B23.

The block data read from the magnetic tape is processed in a similar manner. Thus, the block data from the tape is read into the comparator through the input circuit comprising the cores B37, B38, B60 and B61, and this data then is applied in parallel to the magnetic cores B39 and B40. If the apparatus is set to process an ascending file, core B40 is inhibited and the data is transmitted from core B37 to core B23. If, on the other hand, the file is a descending one, then core B39 is inhibited and the block data is transmitted from core B40 to core B24.

When cores B23 and B24 are not inhibited—that is, when these cores do not receive an inhibiting signal from the suppress core B49—the tape data and the one word register data are transmitted down the two signal transmission lines shown at the center of FIGURE 6. One transmission line comprises the magnetic cores B23, B41, B1, B2, B3, B4, and B5. The other transmission line comprises the magnetic cores B24, B42, B10, B9, B8, B7, and B6. It can be seen that various cross-connections are provided between the two signal transmission lines to the end that a signal existing in one line will inhibit the transmission in the other line. For example, the outputs of cores B41 and B42 serve to inhibit the cores B10 and B1, respectively. Similarly, the outputs of cores B2 and B9 serve to inhibit the cores B9 and B2 respectively, at one later pulse period, and the outputs of cores B5 and B6 serve to inhibit the cores B7 and B4, respectively.

In addition, the outputs of the cores B1 and B10 in the two signal transmission lines of the middle channel are connected in parallel to a pair of additional signal transmission channels shown at the upper and lower portions of FIGURE 6. In the drawings, the middle signal transmission channel is identified as the backward read channel 72, the upper signal transmission channel is identified as the uncomplemented forward read channel 70 and the lower signal transmission channel is identified as the complemented forward read channel 71.

Those skilled in the art will readily appreciate from the foregoing description that the data processed by the comparator circuit may be information that is being read forward or backward, and may be complemented or uncomplemented. Due to this substantial flexibility in the data processing capacity of the invention, there must be some provision for identifying the form of the data being processed and for handling such data in the proper manner.

Advantageously, each multi-bit word handled by the apparatus carries with it an additional bit known as the complement bit. If this complement bit is present, it indicates that the data recorded on the tape for that paricular word has been recorded in is complemented form. Thus, when the data is used or processed, the sensing of a complement bit provides an indication of the complemented or uncomplemented nature of the word.

As the complement bit normally follows the information bits in the word, those skilled in the art can readily appreciate that when the information is being read backwards, the complement bit arrives first at the comparator. Thus, when information is being read backwards, the machine knows immediately whether or not the word being processed is complemented. Further, in making the bit by bit comparison of the word in the one word register with the block word read off the tape to determine which word is the greater of the two or whether equality exists, the first difference in bits between the two words is the significant one during a backward read.

In the backward read channel 72 the magnetic cores B4 and B7 are connected as difference flip-flops, that is, when one magnetic core is in its set condition the other magnetic core is in its unset condition, depending upon which signal transmission line in channel 72 has contained the last highest bit. Similarly, the magnetic cores B14 and B18 in signal channel 70, and magnetic cores B50 and B51 in signal channel 71, serve as difference flip-flops. The set and unset condition of these cores indicate which transmission line of the signal channel contains the last highest bit in the data word being processed.

Thus, in the backward read channel 72, as explained above, the complement bit comes first and the most significant bit of the word comes first. Therefore, the circuit knows immediately if the word is complemented or not, and as the first difference in bits is the significant one in a backward read, the first setting of the difference flip-flop B4 and B7 is the controlling output.

If the information data being compared is being read in a forward direction, the complemented bit comes last and the most significant bit also comes last. Accordingly, during a forward read, the machine has to wait during the processing operation and keep track of both the information in the complemented and uncomplemented channels until the end of the word. To this end, the forward read channel 71 is provided for complemented information, and the forward read channel 70 is provided for uncomplemented information. These two channels process the information in parallel and the output of one of these channels is selected as controlling at the end of the processing when the sampling circuit 73 determines whether the information is in its complemented or uncomplemented form.

The sampling circuit 73 receives its input at core B35 directly from the tape. When core B35 is not inhibited by an output from core B48, the information from the tape is passed through the cores B65, B45, and B46 to the output cores B66 and B67. If the tape data is in its complemented form, there will be an output from core B67 to inhibit cores B19 and B20 so that there will be no output from the uncomplemented information channel 70. In this case, the output of the complemented information channel 71 is permitted to pass through to the comparator output cores B43 and B44. If, on the other hand, the sampling circuit 73 determines that the tape data is uncomplemented, core B67 will be inhibited and there will be an output from core B66 to inhibit cores B52 and B53 of the complemented information channel 71. Under these conditions, cores B19 and B20 will be open and the output of the uncomplemented information channel 70 will be applied to the comparator output cores B43 and B44.

As stated above, when the information is being read in the forward direction, the last difference in bits is the controlling information, so the last difference flip-flop to be set is the effective output. Thus, when the information is determined to be in its complemented form, the difference flip-flops B50 and B51 are sampled by the sampling circuit 73 after the last bits of the word have gone through to provide either an alpha or a beta output from the cores B43 and B44 respectively. If the information being read forward is in its uncomplemented form, then the difference flip-flops B14 and B18 of channel 70 are sampled by sampling circuit 73 after the last bits of the word have gone through to provide either an alpha or a beta output at the cores B43 and B44, respectively.

The alpha or beta output of the comparator circuit is used to determine the next search step of the apparatus in accordance with the hunt pattern shown in FIGURE 2 of the drawing. Accordingly, the output of the comparator is applied to the tape control circuit 56 to control tape movement at each step in the hunt of the tape for a desired block of information data.

I have shown and described an illustrative method and means for quickly locating a desired block or item of information in a record medium having recorded thereon many thousands of such data blocks or items. In accordance with the unique hunt pattern described in detail above, the hunt time for the desired information is reduced considerably from that required in data processing machines of the prior art.

It will be appreciated by those skilled in the art that changes may be made in the construction and method of operation of the above-described data processing apparatus without departing from the real spirit and purpose of the invention, and that we intend to cover by the appended claims any modified forms of structures, or use of equivalents which reasonably may be included within their scope.

What is claimed as the invention is:

1. Data storage apparatus comprising an elongated record tape adapted to be reversibly driven, said record tape being divided into two logical halves each of which comprises a plurality of data blocks alternately interlaced with the blocks of the other half, said data blocks being recorded in a logically ascending or descending manner on said tape such that the data on one logical half of said tape may be read by movement of the tape in one direction and the data on the other logical half of said tape may be read by movement of the tape in the other direction, electromagnetic transducing means associated with said record tape for transferring data therefrom to suitable utilization means, and control means operable to selectively drive said tape backward and forward relative to said electromagnetic transducing means to make successive comparisons between the data blocks on said tape and an item of control information until the desired data block is found as indicated by coincidence between said data block and said control information, the particular logical half of said record tape read, the direction of movement of said record tape and the extent of movement of said record tape in each direction being determined automatically as a result of each one of said successive comparisons.

2. Data storage apparatus comprising an elongated record tape adapted to be reversibly driven, said record tape being divided into first and second logical halves each of which comprises a plurality of data blocks alternately interlaced with the data blocks of the other half, and control means for minimizing the time required to locate a desired data block on said record tape, said control means comprising transducing means adapted to read a block in the backward direction on the second logical half of the tape, means to compare the latter block with the block number sought and to cause further searching of the blocks in the forward direction on the second half of the tape when the first block read varies from the block number sought in a first predetermined manner, and to cause further searching of the blocks in the forward direction on the first logical half of the tape when the first block read varies from the block number sought in a second predetermined manner, and means to make further successive comparisons in a direction and on a tape logical half determined by each such comparison until the desired data block is located on the record tape.

3. Data storage apparatus comprising an elongated record tape adapted to be reversibly driven, said record tape being divided into two logical halves each of which comprises a plurality of data blocks alternately interlaced with the blocks of the other half, electromagnetic transducing means associated with said record tape for transferring data therefrom to a suitable utilization means, driving means for moving said tape in either direction past said transducing means and control means for minimizing the time required to locate a desired data block on said record tape, said control means including a comparator, means for writing a search key identifying the desired data block into said comparator, means for writing key words from the data blocks read from said tape into said comparator and successively comparing said search keys with said key words, and means for directing the tape read in either direction and on either tape logical half in a manner determined by each successive comparison until the desired data block is located as indicated by a match between the search key and a key word read from the tape.

4. Data storage apparatus comprising an elongated record tape adapted to be reversibly driven, said record tape being divided into two logical halves each of which comprises a plurality of data blocks alternately interlaced with the blocks of the other half, and control means for minimizing the time required to locate a desired data block on said record tape, said control means comprising means for making successive comparisons between a search key representative of the desired data block and the key words identifying the data blocks recorded on the tape, and means responsive to each successive comparison for controlling the direction of tape movement and the tape logical half read on the next comparison until a match is reached between the search key and a key word read from the tape to indicate that the desired data block has been located on the tape.

References Cited in the file of this patent

UNITED STATES PATENTS

| | | |
|---|---|---|
| 2,692,728 | Strickler | Oct. 26, 1954 |
| 2,782,398 | West et al. | Feb. 19, 1957 |
| 2,900,132 | Burns et al. | Aug. 18, 1959 |

OTHER REFERENCES

"Proceedings of the Eastern Joint Computer Conference," Dec. 10–12, 1956.

Article entitled "Apparatus for Magnetic Storage on Three-Inch Wide Tapes," pp. 84–90.